US011336052B2

(12) United States Patent
Cairns (10) Patent No.: US 11,336,052 B2
(45) Date of Patent: May 17, 2022

(54) UNDERWATER MATEABLE AND UN-MATEABLE ELECTRICAL CONNECTOR (71) Applicant: Pontus Subsea Connectors LLC, Ormond Beach, FL (US)

(72) Inventor: James L. Cairns, Ormond Beach, FL (US)

(73) Assignee: Pontus Subsea Connectors LLC, Ormond Beach, FL (US)

( * ) Notice: Subject to any disclaimer, the term of this patent is extended or adjusted under 35 U.S.C. 154(b) by 0 days.

(21) Appl. No.: 17/376,495

(22) Filed: Jul. 15, 2021

(65) Prior Publication Data

US 2021/0344137 A1    Nov. 4, 2021

Related U.S. Application Data (63) Continuation of application No. PCT/US2020/013318, filed on Jan. 13, 2020.

(60) Provisional application No. 62/795,104, filed on Jan. 22, 2019.

(51) Int. Cl.
*H01R 13/523* (2006.01)
*H01R 13/52* (2006.01)
(Continued)

(52) U.S. Cl.
CPC ....... *H01R 13/523* (2013.01); *H01R 13/5216* (2013.01); *H01R 13/629* (2013.01); *H02G 15/046* (2013.01); *H01B 7/282* (2013.01); *H01B 7/285* (2013.01); *H01R 4/70* (2013.01); *H01R 13/52* (2013.01); *H01R 13/5219* (2013.01); *H01R 13/533* (2013.01);
(Continued)

(58) Field of Classification Search
CPC .............. H01R 13/523; H01R 13/5216; H01R 13/629; H01R 13/5219; H01R 13/52; H01R 13/533; H01R 4/70; H02G 15/046; H02G 15/04; H02G 15/043; H02G 15/013; H01B 7/282; H01B 7/285
USPC ................................................. 439/276, 936
See application file for complete search history.

(56) References Cited

U.S. PATENT DOCUMENTS 3,271,727 A   9/1966 Nelson
3,522,576 A   8/1970 Cairns
(Continued)

FOREIGN PATENT DOCUMENTS

CN   101656371 A   2/2010

OTHER PUBLICATIONS

International Search Report and Written Opinion dated Apr. 6, 2020 for PCT Application No. PCT/US2020/013318.

*Primary Examiner* — Abdullah A Riyami
*Assistant Examiner* — Justin M Kratt
(74) *Attorney, Agent, or Firm* — Mark T. Vogelbacker (57) ABSTRACT A receptacle unit of a connector for sealably engaging and disengaging contacts therein can include one or more closed inner chambers. At least one of the one or more inner chambers being configured to contain a receptacle contact. Each receptacle contact can be configured to engage a plug contact of a plug unit of a connector. A closed cavity can be at least partially in contact with each inner chamber. The closed cavity can contain a deformable material. At least a portion of the closed cavity can be configured to be movable with respect to another portion of the closed cavity to permit balancing of pressure of the deformable material within the closed cavity to pressure outside of the closed cavity.

15 Claims, 4 Drawing Sheets (51) Int. Cl.
  *H01R 13/629*   (2006.01)
  *H02G 15/04*    (2006.01)
  *H01R 13/533*       (2006.01)
  *H02G 15/013*       (2006.01)
  *H01R 4/70*         (2006.01)
  *H01B 7/285*        (2006.01)
  *H01B 7/282*        (2006.01)

(52) U.S. Cl.
  CPC .......... *H02G 15/013* (2013.01); *H02G 15/04* (2013.01); *H02G 15/043* (2013.01)

(56) References Cited

U.S. PATENT DOCUMENTS

| | | |
|---|---|---|
| 3,653,207 A | 4/1972 | Stenger et al. |
| 4,373,767 A | 2/1983 | Cairns |
| 4,948,377 A | 8/1990 | Cairns |
| 5,203,805 A | 4/1993 | Cairns |
| 5,271,158 A | 12/1993 | Chen |
| 5,397,859 A * | 3/1995 | Robertson ................ H01R 4/70 174/92 |
| 5,645,438 A * | 7/1997 | Cairns .................. G02B 6/3816 439/139 |
| 5,655,442 A | 8/1997 | Conrad et al. |
| 7,285,003 B2 | 10/2007 | Cairns et al. |
| 9,263,824 B2 | 2/2016 | Cairns |
| 10,236,623 B1 | 3/2019 | Cairns |
| 2003/0007738 A1 | 1/2003 | Carins et al. |
| 2010/0035452 A1* | 2/2010 | Mudge, III .......... H01R 13/533 439/271 |
| 2014/0097001 A1 | 4/2014 | Campbell et al. |
| 2015/0340800 A1* | 11/2015 | Cairns .................... H01R 24/38 439/201 |
| 2017/0003455 A1 | 1/2017 | Cairns |
| 2018/0193627 A1 | 7/2018 | Cairns |

\* cited by examiner

FIGURE 7

UNDERWATER MATEABLE AND UN-MATEABLE ELECTRICAL CONNECTOR

CROSS-REFERENCE TO RELATED APPLICATION

The present application is a continuation of International Application No. PCT/US20/13318, filed Jan. 13, 2020, which claims priority to U.S. Provisional Patent Application No. 62/795,104, filed Jan. 22, 2019 and titled "UNDERWATER MATEABLE AND UN-MATEABLE ELECTRICAL CONNECTOR," both of which are hereby incorporated by reference in their entirety.

FIELD OF THE PRESENTLY DISCLOSED TECHNOLOGY

In one embodiment, the presently disclosed technology is an electrical plug and receptacle connector that can be mated and/or unmated underwater, even at the greatest ocean depths. Both the plug and receptacle bodies can be made from elastomeric material, herein referred to simply as rubber.

BACKGROUND

Subsea electrical connectors generally fall into one of two categories. One category consists of connectors that can be mated and/or unmated on the sea surface and then can be submerged, even to great depths. They are called "dry-mate" connectors. The second category is made up of connectors that can be mated and/or unmated either on the surface or underwater. They are called "wet-mateable" connectors. The presently disclosed technology relates to wet-mateable connectors.

The first commercially available wet-mateable connectors were introduced in the 1960's (see, e.g., Nelson, U.S. Pat. No. 3,271,727). Examples of these connectors are manufactured by Cooper Industries of Houston, Tex. and/or Eaton of Cleveland, Ohio. They are "interference-fit" products wherein ring-like plug contacts within a rubber body are separated by rubber segments along a cylindrical shaft. The shaft penetrates a rubber-molded receptacle having a bore wherein respective annular socket contacts are similarly separated by rubber segments. The bore is open on both ends, and when the plug shaft enters, it squeegees water out the opposite end of the receptacle bore as the respective plug contacts move into engagement with those of the receptacle. These rubber-bodied interference-fit connectors are widely used, and are exceptional for many non-critical operations. However, they are not highly reliable and often cannot be unmated at significant water depth. The low reliability can come mostly from traces of seawater that are not cleanly squeeged out of the receptacle bore during mating, thus leaving electrical leakage paths either between adjacent contacts along the bore, or to the external environment. Inability to unmate at depth can arise from the fact that the connector's rubber portions are much more compressible than the metal contacts they surround. Under high pressure the rubber portions are pressed tightly around the contacts, effectively binding the plug shaft within the receptacle bore.

Another type of rubber-molded underwater mateable connector uses a different form of interference fit between the plug and receptacle units. Examples of these connectors are also manufactured by Cooper Industries of Houston, Tex. and/or Eaton of Cleveland, Ohio. In this type, round-section plug pins have extended shafts whose bases are encapsulated by larger diameter cylindrical rubber sleeves from which the conductive pin portions protrude. The respective socket contacts are recessed within rubber cylindrical bores. When a plug pin is fully penetrated into its respective socket, the heavy rubber sleeve of the plug pin forms a sealed interference fit into its respective rubber cylindrical bore. Upon mating underwater, water contained within the recessed socket bore is mostly forced back out of the recess by the entering pin, but some water can remain trapped around the contacts. This second sort of interference-fit connector was introduced commercially by the French company SOURIAU SAS in the 1970's. The fundamental design was never patented. As with the previously described interference-fit connectors, these can have electrical leakage problems and under certain circumstances can be extremely difficult to unmate at high deep-sea pressures.

Both types of interference-fit connectors mentioned above are commercially available from SEACON, COOPER Interconnect, SOURIAU SAS, and a number of other suppliers. None of the prior-art rubber-molded connectors have means, other than trapping environmental fluid, to balance the pressure around the mated contacts to that of the ambient working environment, and hence can have the concomitant problems of high unmating force and electrical leakage.

Commercially available underwater mateable connectors with structures different from those mentioned above can avoid the reliability and unmating problems by reducing the pressure difference between the volume surrounding the mated contacts and the outside environment. These are often referred to as "pressure-balanced" connectors. In these, pin-and-socket contacts are mated in a chamber containing a benign flowable substance that protects them from the external environment. The protective flowable dielectric substance hereinafter referred to simply as "fluid" or "oil" for convenience only, is pressure-balanced to the ambient environment by way of a compensating element, which is typically a movable portion of the chamber wall. Connectors of this sort have elongated pins whose shafts are coated to isolate the conductive portions from the environment, and have electrically conductive contact tips of substantially the same diameter as the coated pins. The tips extend beyond the protective coating. When mating, the pins enter the fluid-filled chamber by way of penetrable passages through an end-seal. The end-seal passages can seal the chamber from the outside environment before, during, and after mating and de-mating. Once mated, the conductive pin-tips are completely immersed within the benign contact chamber fluid, leaving at most a small portion of the protected shafts exposed to the in-situ environment.

Some connectors in the above category have blade-like pins, for example (U.S. Pat. Nos. 3,653,207 and 9,263,824); others have pins with rounded cross sections as in (U.S. Pat. Nos. 4,373,767, 4,948,377; 5,271,158; 5,655,442, 7,285,003 and pending U.S. application Ser. No. 16/111,790). All of the receptacles in these fluid-filled connectors have oil chambers with elastomeric end-seals which can permit the plug pins to sealable enter and withdraw from the chambers during mating and unmating.

SUMMARY

Relative to the presently disclosed technology, all prior-art oil-filled and pressure-balanced connectors comprise many more separate components. The presently disclosed technology provides an over-molded, pressure-balanced, fluid-filled, wet-matable connector that can be more economically built than prior-art pressure-balanced products without sacrificing any of their reliability.

All rubber-molded underwater-mateable connectors available commercially can be impossible or at least difficult to disconnect at great ocean depths, and can be unreliable due to electrical leakage paths. Currently available fluid-filled and pressure-balanced underwater mateable connectors do not have those problems, but are more expensive than their rubber-molded counterparts, and they incorporate significantly more components. The complexity and expense of prior-art fluid-filled and wet-mateable underwater connectors put them out of reach of many, if not most, harsh environment projects. There are many applications in which it would be desirable to have low-cost, simple, rubber-molded connectors that can avoid the aforementioned problems by being fluid-filled and pressure-balanced, but without the high part-count. The presently disclosed technology fulfills that and other needs.

Embodiments of the presently disclosed technology described herein provide for an apparatus which can include a first connector unit (hereafter called the "plug") and a second connector unit (hereafter called the "receptacle"), which can be repeatedly connected and disconnected underwater or in other harsh environments without loss of integrity. The described embodiments are intended for use subsea, but could be used in myriad applications, for example wherein pin and socket contacts, when connected, must remain sealed from each other and from the in-situ environment; and when disconnected, the receptacle contacts must still remain isolated from each other and from the in-situ environment.

In embodiments of the presently disclosed technology, the plug or a plug unit can house one or more electrical "pins," which can include elongated, cylindrical, insulated shafts with exposed electrically-conductive tips. The receptacle or a receptacle unit can house a respective one or more electrical "sockets" housed in one or more fluid-containing or oil-filled chambers sealed from the exterior environment. When the plug and receptacle units are joined, the one or more plug pins can sealably penetrate respective one or more resilient passages into the receptacle, their conductive tips thereby joining the respective one or more socket contacts within the one or more fluid-containing or oil-filled chambers. The receptacle contacts within the fluid or oil chamber can remain sealed from the outside environment before, during, and/or after mating and demating of the plug and receptacle units. At least a portion of each closed chamber can be configured to be movable with respect to another portion of the closed chamber to permit balancing of pressure within the closed chamber to pressure outside the closed chamber.

BRIEF DESCRIPTION OF THE DRAWINGS

A multiple-circuit connector embodiment including at least some of the presently disclosed technology's salient features is presented herein in general terms without regard to any specific application. It will be easily understood that the described apparatus can be readily adapted to a wide variety of contact numbers and arrangements, sizes, materials, and/or configurations.

Other features and advantages of the presently disclosed technology will become more readily apparent to those of ordinary skill in the art after reviewing the following detailed description and the accompanying drawings, in which like reference numbers refer to like parts.

DETAILED DESCRIPTION

Certain terminology is used in the following description for convenience only and is not limiting. The words "forward" and "rearward" (and derivations thereof) designate directions in the drawings to which reference is made. Unless specifically set forth herein, the terms "a," "an" and "the" are not limited to one element but instead should be read as meaning "at least one." Furthermore, the terminology used herein includes at least two types of elastomers. One is a strong, waterproof, elastic substance made from natural ingredients or alternately produced chemically. In everyday usage it is called rubber, and is referred to as such throughout this description. One other elastomer referred to throughout this description is elastomeric gel. It is a soft, highly viscoelastic polymer substance. Elastomeric gels have elastic restoring forces which distinguish them from flowable, low viscosity gels which have little or no elasticity. Skin care gels, for instance, are flowable, whereas gels used in shoe sole inserts are not flowable; they are elastomeric. The terminology includes the words noted above, derivatives thereof and words of similar import.

Figure 1:
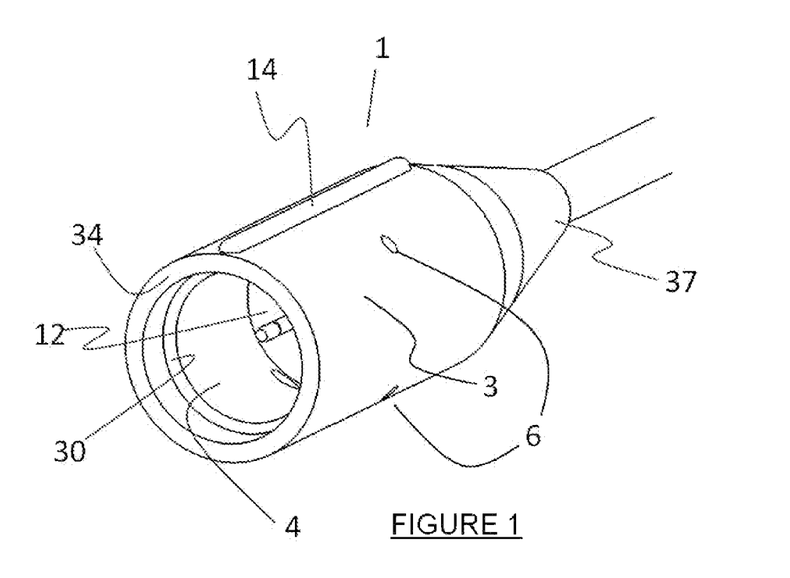
FIG. 1 is a perspective view of connector plug unit in accordance with one embodiment of the presently disclosed technology.
Figure 2:
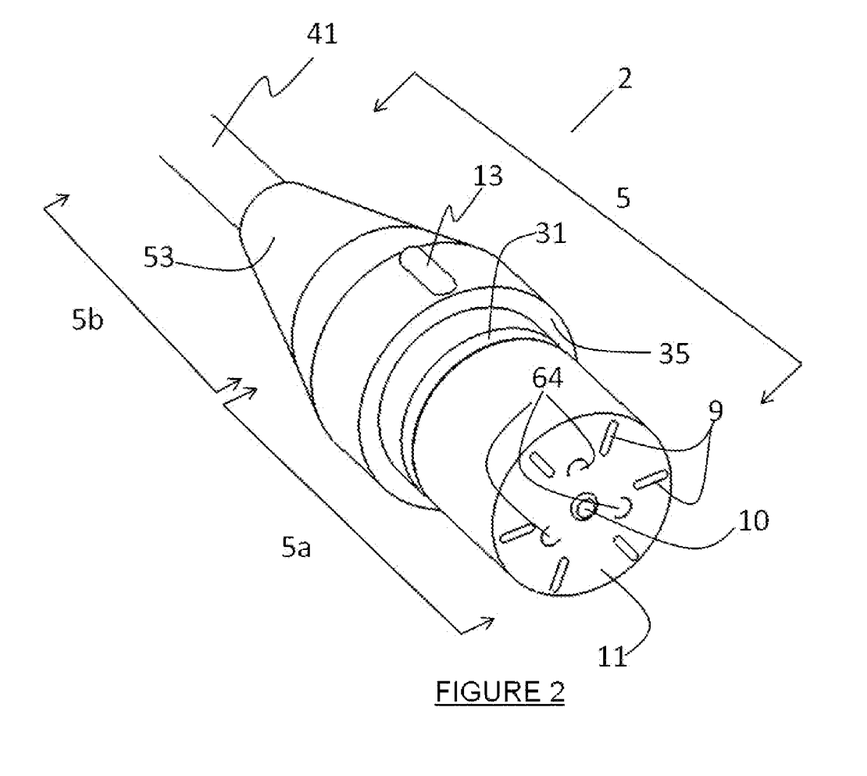
FIG. 2 is a perspective view of a connector receptacle unit in accordance with one embodiment of the presently disclosed technology.

FIGS. 1 and 2 are perspective views of a three-circuit embodiment of the presently disclosed connector illustrating respectively plug or plug unit 1 (sometimes referred to as the "first unit"), and receptacle or receptacle unit 2 (sometimes referred to as the "second unit"). Molded rubber plug body 3 can include frontal bore 4. Molded rubber body 5 of receptacle unit 2 can consist of two parts: forward portion 5a, and rearward portion 5b. Frontal bore 4 of plug body 3 can be sized and/or shaped to receive in approximate axial alignment at least a portion of forward portion 5a of molded body 5 of receptacle 2. Material, such as fluid, liquid and/or gas (e.g. air), from the surrounding environment that is displaced by the entrance or movement of forward portion 5a of receptacle 2 into plug bore 4 can be vented out of bore 4 via one or more vent ports or holes 6, and can also be vented back out of bore 4 via the radial interface between bore 4 and forward portion 5a of receptacle 2. Forward protruding radial ribs 9, and central forward protruding nib 10 on face 11 of receptacle forward portion 5a keep receptacle face 11 of receptacle 2 from forming a sealing engagement with face 12 of plug unit 1 when plug unit 1 and receptacle unit 2 are fully engaged. Raised axial rib 13 on forward portion 5a of receptacle body 5 in cooperation with axial rib 14 on plug body 3 can provide both visual and tactile indicators that aid in rotationally aligning units 1 and 2 when connecting the units.

Figure 3:
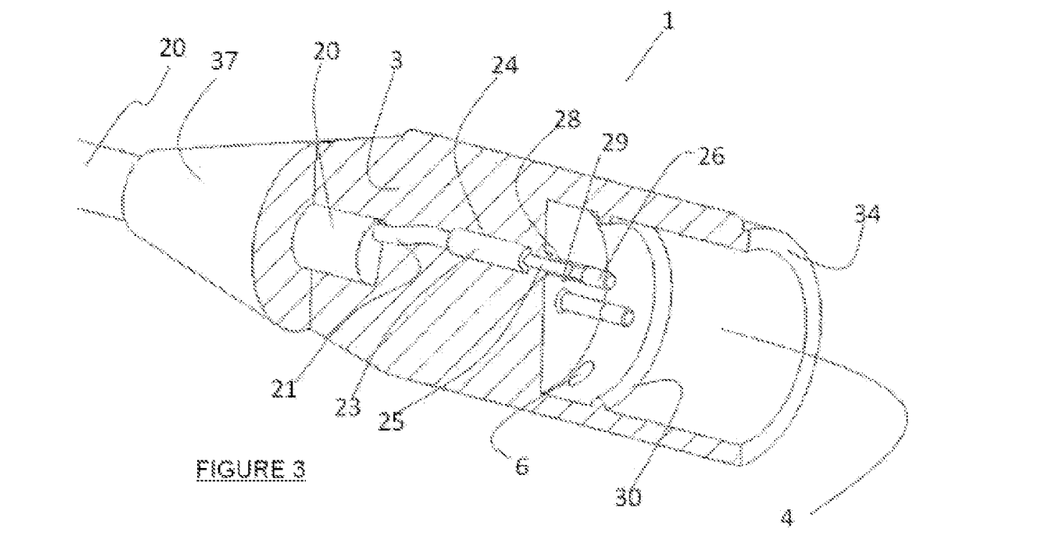
FIG. 3 is a partial axial cross-sectional view of the plug unit of FIG. 1.

FIG. 3 illustrates one embodiment of plug 1 in partial axial half-section. Plug body 3 can be made from rubber that is over-molded onto cable 20, onto one or more individual electrical conductors 21, and onto rearward portion 23 of one or more plug contacts or plug pins 24. Optionally, each plug contact 24 consists of rearward portion 23, shaft 25, and tip 26. Substantial portions of plug contacts 24 can be included in body 3 of plug unit 1. External surfaces of the various elements molded within rubber plug body 3 can be treated in routine ways, for example as by the application of bondable Chemlok substrates provided by Lord Corporation, such that they are both sealed and mechanically bonded within rubber plug body 3. Optionally, conductors or wires, 21 are mechanically and electrically attached by routine means such as by soldering or crimping to recesses (not shown) in rearward portions 23 of plug contacts 24.

Portions 28 of plug body 3 can extend outward along shafts 25 of plug contacts 24 (e.g., functioning as a sleeve) while leaving conductive tips 26 of plug contacts 24 exposed. Shafts 25 of plug contacts 24 can be coated with dielectric substrate 29 prior to overmolding, thereby providing a second, or redundant, electrically insulating barrier between conductive shafts 25 and the outside environment.

Inwardly protruding (and optionally annular) nib 30 of elastomeric plug body 3 can seat into complementary groove 31 of receptacle unit 2 when units 1 and 2 are fully engaged, thereby providing some force to retain the two units in connected position when mated. When units 1 and 2 are fully engaged, forward face 34 of plug unit 1 can butt against face 35 of receptacle unit 2. Tapered molded rubber portion 37 of plug body 3 can aid in mechanically attaching plug body 3 to cable 20, and can provide some bending strain relief at the junction of cable 20 and plug body 3.

Figure 4:
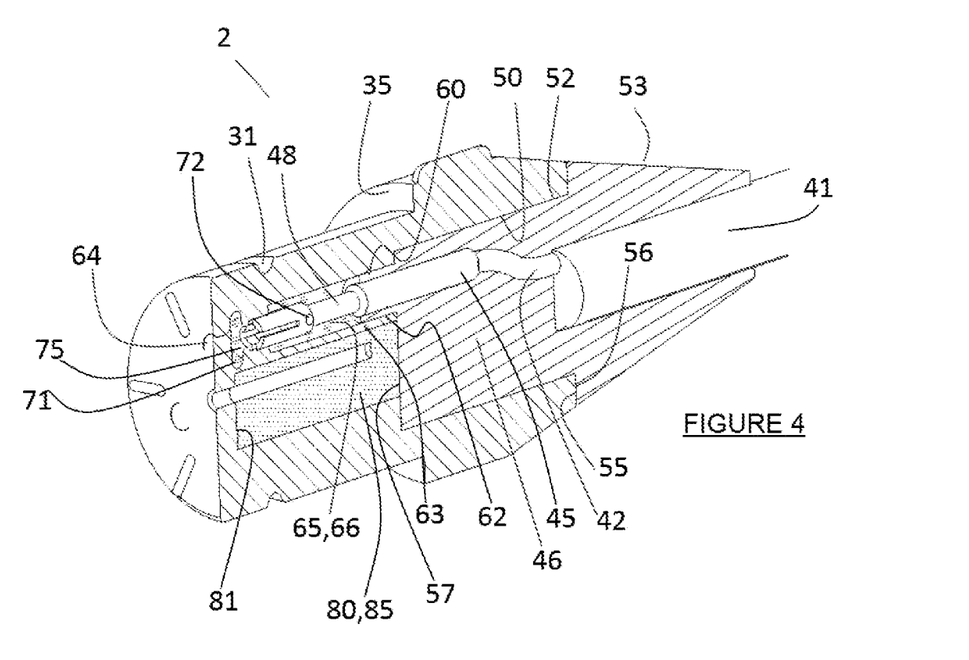
FIG. 4 is a partial axial half-section view of the connector receptacle unit of FIG. 2.
Figure 5:
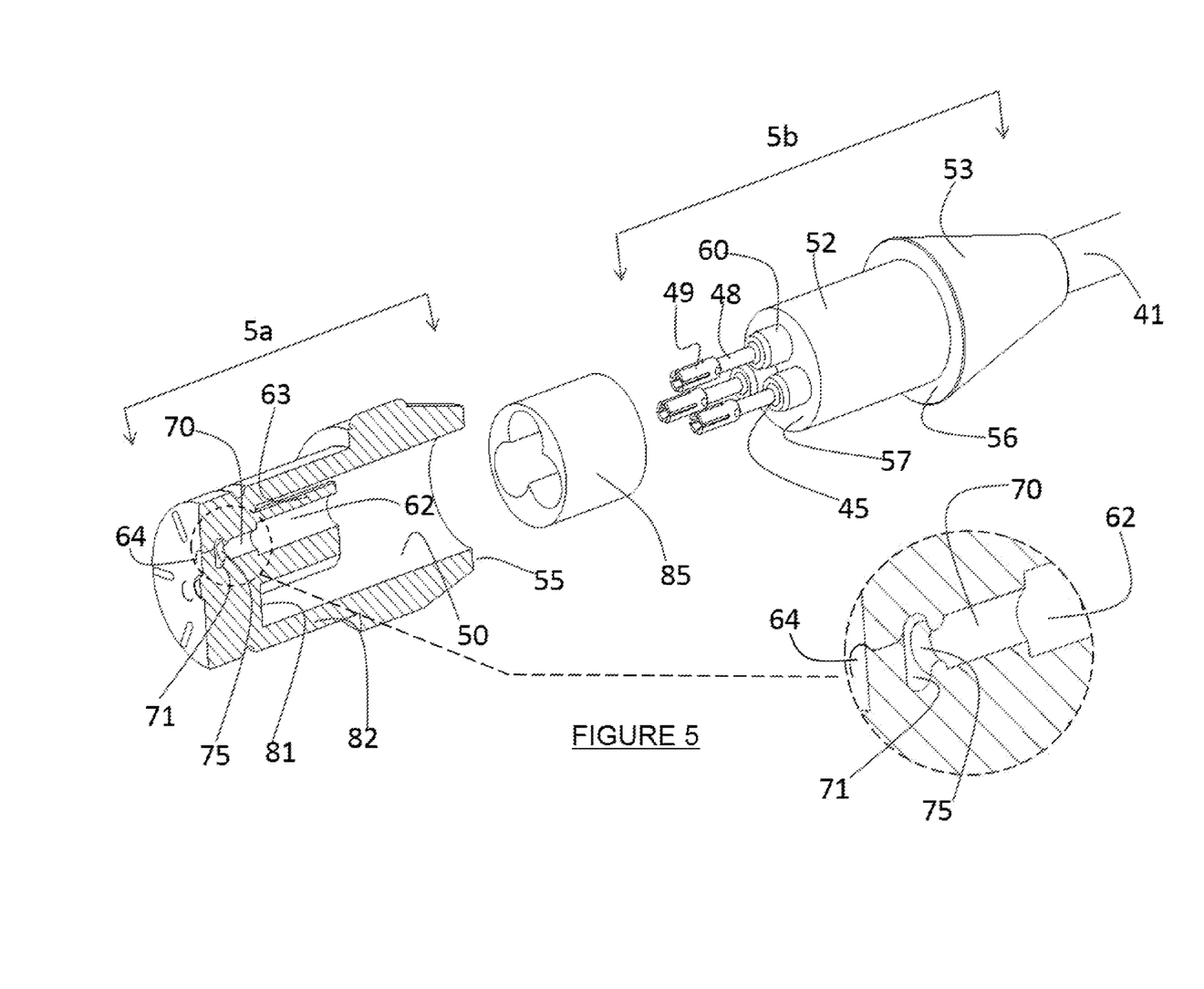
FIG. 5 is an exploded view of the receptacle unit of FIG. 2, wherein portions are shown in axial half section.

FIG. 4 shows one embodiment of receptacle unit 2 in partial half-section, and FIG. 5 shows a complementary view of unit 2 which is exploded axially. Receptacle rearward portion 5b can be made from rubber that is over-molded onto cable 41, onto one or more individual electrical conductors 42, and onto rearward portion 45 of one or more receptacle contacts 46. Optionally, each receptacle contact 46 consists of rearward portion 45, shaft 48, and socket 49. Substantial portions of receptacle contacts 46 can be included in rearward portion 5b of molded body 5 of receptacle unit 2.

As with plug unit 1, the surfaces of elements molded within rubber receptacle rearward portion 5b can be treated in routine ways, for example as by the application of bondable Chemlok substrates provided by Lord Corporation, such that they are both sealed and mechanically bonded within elastomeric receptacle rearward 5b. Optionally, conductors or wires 42 are mechanically and electrically attached by routine means such as by soldering or crimping to recesses (not shown) in rearward portions 45 of receptacle contacts 46.

In one embodiment, plug contacts 24 and receptacle contacts 46 are radially distributed at angles within plug unit 1 and receptacle unit 2, respectively, such that the units can be connected in only one rotational orientation.

Figure 6:
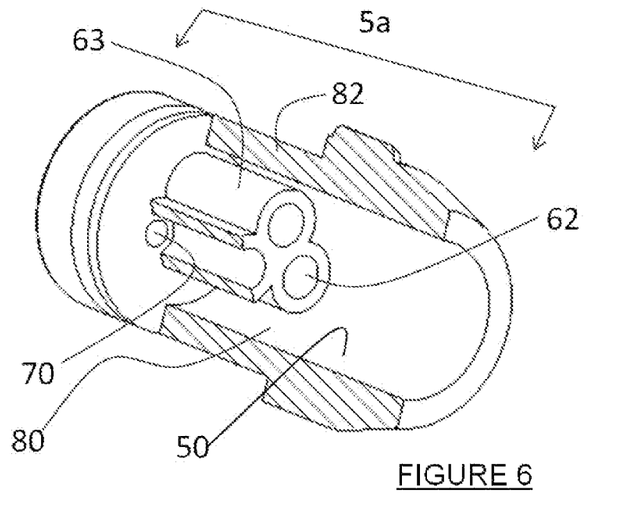
FIG. 6 is a partial axial cross-sectional view of a forward body portion of the receptacle unit of FIG. 2.

Forward portion 5a of receptacle unit 2, illustrated in FIGS. 4 and 5, and again in FIG. 6, can be molded from rubber. At least a substantial part of inner surface 50 of forward portion 5a of receptacle unit 2 can be bonded, e.g., post-mold bonded, onto wall 52 of receptacle rearward portion 5b, for example utilizing bondable Chemlok agents provided by Lord Corporation, such that they are both sealed and mechanically bonded together. Tapered portion 53 of receptacle rearward portion 5b can both (i) aid in mechanically attaching rearward 5b to cable 41, and (ii) provide some bending strain relief at the junction of cable 41 and receptacle rearward portion 5b.

When assembled onto receptacle rearward portion 5b, surface 55 of receptacle forward portion 5a can butt against surface 56 of receptacle rearward portion 5b. Optionally, in the final assembly of receptacle unit 2, surfaces 52 and 56 of receptacle rearward portion 5b are sealably bonded respectively to surfaces 50 and 55 of receptacle forward portion 5a.

As shown in FIGS. 4 and 5, receptacle contacts 46 protrude outwardly or forwardly from a remainder of rearward portion 5b. Sleeves 60 can extend forwardly from face 57 of rearward portion 5b encapsulating rearward portions 45 of receptacle contacts 46. When receptacle forward portion 5a and rearward portion 5b are assembled together, rear body sleeves 60 can sealably engage bores 62 in forward portion 5a. The forward ends of bores 62 are sealed by resilient end-seals 64. When receptacle forward and rearward portions 5a, 5b are assembled together, bores 62 become completely closed inner chambers 65 (as shown in FIG. 4).

Inner chambers 65 can be sealably penetrable through end-seals 64. Inner chambers 65 can be filled with a flowable dielectric material 66, hereinafter referred to simply as fluid or oil. At least a portion of radial walls 63 defining bores 62 can be elastically deformable in response to minor pressure differences across them, and thus can substantially balance the pressure of fluid 66 within bores 62 to the pressure outside of walls 63. When plug unit 1 and receptacle unit 2 are mated, at least a tip of plug pins 24 can sealably penetrate respective receptacle chamber end-seals 64 to engage respective receptacle sockets 49 in their respective inner chamber 65. The volume of fluid 66 displaced by entering plug pins 24 is accommodated by deformable radial walls 63 of bores 62.

Rearward portion 45 of each receptacle contact 46 can be fixed within receptacle rearward portion 5b, into which they can be sealably bonded. Sockets 49 on the forward ends of receptacle contacts 46 can extend into forward extensions 70 (see FIG. 5) of inner chambers 65 of receptacle forward portion 5a into which sockets 49 can also be bonded. Being thus fixed on one end into receptacle rearward portion 5b, and on the other end into receptacle forward portion 5a, receptacle contacts 46 can act as struts which can stiffen receptacle unit 2 against bending, torsion, and axial compression and extension.

Entrance chambers 71 can be formed within or can be in fluid communication with forward extensions 70 of bores 62. Entrance chambers 71 are configured to communicate with and/or receive at least some of fluid 66 from inner chamber 65 through ports or holes 72 in the bases of receptacle sockets 49. Prior to the mating of units 1 and 2, each of inner chambers 65, respective bore 62, and respective entrance chamber 71, form a continuous volume of fluid 66.

Figure 7:
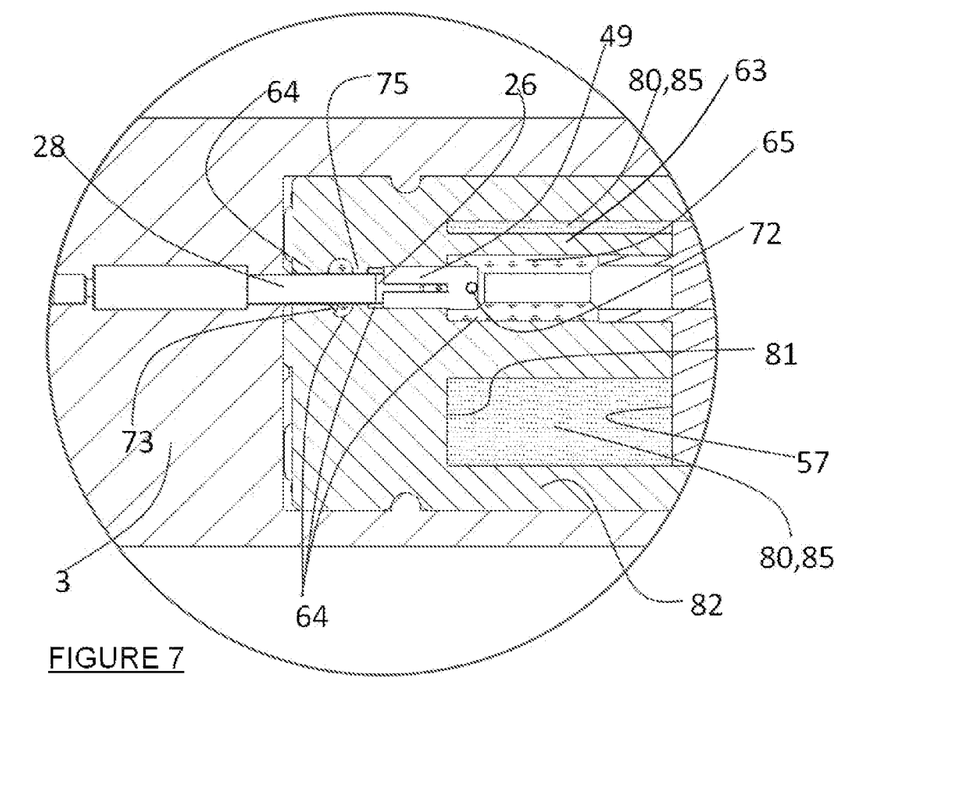
FIG. 7 is an axial cross-sectional view of a portion of the receptacle unit of FIG. 2.

FIG. 7 is a partial axial cross-sectional view of mated units 1 and 2 including a view of tip 26 of plug pin 24 engaged with and/or received by receptacle socket 49. As plug pin 24 enters end-seal 64, a small portion 73 of end-seal 64 can be extruded and/or move into entrance chamber 71 of respective bore 62. When plug unit 1 and receptacle unit 2 are fully mated, an inward facing ring-like seal 75 in each respective forward extension 70 of forward portion 5a can form a secondary seal between forward portion 5a and respective overmolded portion 28 of plug-pin shaft 25 of plug pin 24, thereby sealing entrance chamber 71.

Ring-like or second seal 75 can provide a light interference fit to overmolded portion 28 of plug-pin shaft 25, such that some leakage past second seal 75 can occur in the presence of pressure differences between the fluid in first chamber or entrance chamber 71 and the fluid in second chambers or inner chamber 65. The leakage past ring-like seal 75 can insure that entrance chamber 71 can replenish any loss of fluid by drawing as needed from inner chamber 65. When units 1 and 2 are fully mated, there can be at least two axial elastomeric seals (i.e., end-seal(s) 64 and ring-like seal(s) 75), and at least two fluid chambers (e.g., entrance chamber(s) 71, and inner chamber(s) 65), between sockets 49 and the outside environment.

Resilient end-seals 64 shaped to sealably receive cylindrical plug contacts 26 in the presently described embodiment can be of the tap-and-bore construction disclosed in U.S. Patent Application Publication No. 2018-0193627, which is incorporated herein in its entirety as a reference. Those skilled in the art will recognize that other contact and end-seal combinations could equally well be used in the presently disclosed technology. For example, either the cylindrical-contact, spring-and-stopper construction of U.S. Pat. No. 5,203,805, or the slit-and-blade construction of U.S. Pat. No. 9,263,824 could be used, which are each incorporated herein in their entirety as a reference.

As noted, when receptacle forward portion 5a and rearward portion 5b are assembled, sealed inner chambers 65 are formed. In at least one embodiment, sealed or closed cavity 80, best seen in FIGS. 4, 5, and 7, is also formed when receptacle forward portion 5a and rearward portion 5b are assembled. Cavity 80 is sealed on its forward end by wall 81 of receptacle forward portion 5a, and on its rearward end by wall 57 of receptacle rearward portion 5b. The outer radial wall of cavity 80 is defined by wall 82 of receptacle forward portion 5a. Cavity 80 is sealed from inner chamber(s) 65 by wall(s) 63 of inner chamber(s) 65. Walls 63 of fluid-filled inner chamber(s) 65 can form at least a portion of the walls defining cavity 80. Cavity 80 can, thus, be at least partially in contact with, and optionally at least partially or completely surround, each inner chamber 65.

During the assembly of receptacle forward portion 5a and rearward portion 5b, cavity 80 can be filled with elastomeric gel 85 which exhibits sufficient elastic deformability to balance pressure changes within inner chamber(s) 65, to the pressure outside of receptacle unit 2. Elastomeric gel 85 can be a preformed elastomeric gel, optionally with a bulk modulus close to that of the rubber molded portions of receptacle unit 2.

It is known in prior art to fill the contact mating chambers of pressure-balanced underwater connector receptacles with flowable gels, as for example in U.S. Pat. No. 3,522,576 and others. If these prior-art gels were not flowable they would not be able to move freely out of electrical or optical sockets, and therefore would impede coupling of plug and receptacle contacts. Elastomeric gels would not be suitable for filling the contact mating chambers of pressure balanced underwater connector receptacles because they would impede coupling of the pin-and-socket electrical contacts. Although the use of flowable gels is known in prior art, the use of elastomeric gels in pressure-balanced underwater connectors is not known in the prior art.

Gel 85 in the presently disclosed technology can be a low-durometer elastomeric gel, such as those available through many manufacturers, including but not limited to GelSmart LLC. Gel 85 can be easily deformable in order to substantially balance pressure changes within inner chamber(s) 65 to the pressure outside of receptacle unit 2. Pressure changes within fluid-filled inner chamber(s) 65 can cause slight deformations of chamber wall(s) 63. The deformations of chamber wall(s) 63 create deformations of gel 85, which can be passed on to the external environment via elastomeric outer wall 82 of receptacle forward portion 5a, which can flex inward and/or outward slightly to compensate for the deformations. As shown in FIG. 5, gel 85 can be pre-formed to substantially or completely fill cavity 80, and can be inserted into cavity 80 during the assembly of receptacle unit 2.

Gel 85 within cavity 80 can facilitate balancing pressure differences between the outside environment and fluid 66 within fluid-filled inner chamber(s) 65 of receptacle unit 2. Gel 85 can transmit outside environment pressure variations from outer wall 82 to wall(s) 63 of each inner chamber 65 while still keeping receptacle unit 2 sufficiently firm for normal handling (e.g., to function as intended with plug unit 1). A flowable gel would not provide the required firmness. Elastomeric gel 85 and the aforementioned rigid receptacle contacts 46 cooperate to reduce deformations of unit 2. For extremely rough handling, for instance such as might occur when units 1 and 2 are manipulated by remotely operated vehicles, one or both of units 1 and 2 can be protected by rugged, rigid shells (not shown).

The foregoing discussion illustrates that the presently disclosed technology provides a reliable connector embodying multiple levels of protection for the circuits from each other and from the in-situ environment, while doing so with an uncomplicated and economical construction. In one embodiment, the presently disclosed technology can house the receptacle contacts within flexible fluid chambers which, in turn, can be at least partially enclosed within a chamber containing an easily deformable substance, such as elastomeric gel. The chambers which house the contacts can have relatively simple, redundant closure means to keep them sealed from the outside environment. Optionally, every conductive element of the mated plug and receptacle units is at least doubly sealed from the harsh working environment. Compared to prior-art connectors, the simplicity of the presently disclosed technology makes it relatively economical without sacrificing integrity.

In one embodiment, the presently disclosed technology is directed to a method of engaging the one or more second contacts of the connector receptacle to the one or more first contacts of the connector plug and/or disengaging the one or more second contacts of the receptacle of the connector from the one or more first contacts of the plug of the connector. The method includes sealably inserting at least a portion of one of the first contacts of the plug through a resilient end-seal of the receptacle and into the at least one receptacle inner chamber such that the first contact engages one of the second contacts within the inner chamber. Optionally, the method can further include subsequently sealably withdrawing the first contact from the inner chamber thereby allowing closure of the resilient end-seal.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the presently disclosed technology. Thus, it is to be understood that the description and drawings presented herein represent presently preferred embodiments of the disclosed technology and are, therefore, representative of the subject matter that is broadly contemplated by the presently disclosed technology. It is further understood that the scope of the presently disclosed technology fully encompasses other embodiments that may become obvious to those skilled in the art and that the scope of the presently disclosed technology is accordingly limited by nothing other than the appended claims.

I claim:

1. A connector for sealably engaging and disengaging contacts therein, the connector comprising:
   a first unit having one or more first contacts, each first contact including an elongated shaft with a conductive tip; and
   a second unit having:
   one or more closed inner chambers therein, each inner chamber containing fluid, at least one of the one or more inner chambers being configured to contain one or more second contacts, each second contact being configured to engage one of the first contacts, each inner chamber corresponding to at least one end-seal configured to permit one of the first contacts to (i) sealably penetrate into the inner chamber and engage one of the second contacts within the inner chamber, and (ii) be subsequently sealably withdrawn from the inner chamber, at least a portion of each inner chamber being configured to be movable with respect to another portion of the inner chamber to permit balancing of pressure within the inner chamber to pressure outside of the inner chamber; and
   a closed cavity at least partially in contact with each inner chamber, the closed cavity containing an easily deformable material, the easily deformable material being an elastomeric gel, at least a portion of the closed cavity being configured to be movable with respect to another portion of the closed cavity to permit balancing of pressure of the easily deformable material within the closed cavity to pressure outside of the closed cavity.

2. The connector of claim 1, wherein at least one set of the first and second contacts are electrical contacts, and wherein the fluid is a dielectric fluid.

3. The connector of claim 1, wherein each first contact has a rounded cross-section.

4. The connector of claim 3, wherein each end-seal comprises a resilient end wall portion including a bore and a tap integrally formed with the resilient end wall portion, the tap being movable from a closed position to an open position with respect to the bore, the end wall portion being configured to permit one of the first contacts to (i) sealably penetrate into the closed chamber by displacing the tap from the closed position and engage one of the second contacts within the closed inner chamber, and (ii) be subsequently sealably withdrawn from the closed inner chamber thereby allowing the tap to return to the closed position.

5. The connector of claim 3, wherein each end-seal comprises spring-and-stopper construction.

6. The connector of claim 3, wherein each end-seal comprises slit-and-blade construction.

7. The connector of claim 1, wherein bodies of the first unit and the second unit are formed of rubber.

8. A receptacle unit of a connector for sealably engaging and disengaging contacts therein, the receptacle unit comprising:
   one or more closed inner chambers, each inner chamber containing fluid, at least one of the one or more inner chambers being configured to contain one or more receptacle contacts; and
   a closed cavity at least partially in contact with each inner chamber, the closed cavity containing a deformable material, the deformable material being an elastomeric gel, at least a portion of the closed cavity being configured to be movable with respect to another portion of the closed cavity to permit balancing of pressure of the deformable material within the closed cavity to pressure outside of the closed cavity.

9. The receptacle unit of claim 8, wherein each receptacle contact is configured to engage a plug contact of a plug unit of a connector, each inner chamber corresponding to at least one end-seal configured to permit one of the plug contacts to (i) sealably penetrate into the inner chamber and engage one of the receptacle contacts within the inner chamber, and (ii) be subsequently sealably withdrawn from the inner chamber.

10. The receptacle unit of claim 8, wherein the fluid is a dielectric fluid, and wherein at least a portion of each inner chamber is configured to be movable with respect to another portion of the inner chamber to permit balancing of pressure within the inner chamber to pressure outside of the inner chamber.

11. The receptacle unit of claim 8, wherein a body of the receptacle unit is molded and formed of rubber.

12. A connector for sealably engaging and disengaging contacts therein, the connector comprising: a closed cavity within the connector, the closed cavity containing an easily deformable material configured to balance pressure around mated contacts of the connector to that of an ambient working environment of the connector, the easily deformable material including an elastomeric gel, wherein the closed cavity is located within a receptacle unit of the connector, the receptacle unit including one or more closed inner chambers, at least one of the one or more inner chambers being configured to contain a receptacle contact, the receptacle contact being configured to engage a plug contact of a plug unit of a connector, and wherein each inner chamber contains a dielectric fluid.

13. The connector unit of claim 12, wherein each inner chamber corresponds to an end-seal configured to permit the plug contact to (i) sealably penetrate into the inner chamber and engage the receptacle contact within the inner chamber, and (ii) be subsequently sealably withdrawn from the inner chamber.

14. The connector of claim 13, wherein each inner chamber corresponds to at least one second seal configured to permit at least some leakage therethrough when a pressure difference occurs.

15. The connector of claim 12, wherein the closed cavity is least partially in contact with each inner chamber, and wherein at least a portion of the closed cavity is configured to be movable with respect to another portion of the closed cavity to permit balancing of pressure of the deformable material within the closed cavity to pressure outside of the closed cavity.

* * * * *